United States Patent
Yamaguchi et al.

(10) Patent No.: US 11,780,468 B2
(45) Date of Patent: Oct. 10, 2023

(54) VEHICLE-BEHAVIOR PREDICTION METHOD AND VEHICLE-BEHAVIOR PREDICTION DEVICE

(71) Applicant: Nissan Motor Co., Ltd., Yokohama (JP)

(72) Inventors: Shotaro Yamaguchi, Kanagawa (JP); Fang Fang, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 201 days.

(21) Appl. No.: 16/977,639

(22) PCT Filed: Mar. 9, 2018

(86) PCT No.: PCT/IB2018/000325
§ 371 (c)(1),
(2) Date: Sep. 2, 2020

(87) PCT Pub. No.: WO2019/171097
PCT Pub. Date: Sep. 12, 2019

(65) Prior Publication Data
US 2020/0398864 A1    Dec. 24, 2020

(51) Int. Cl.
*B60W 60/00* (2020.01)

(52) U.S. Cl.
CPC .... *B60W 60/0017* (2020.02); *B60W 60/0027* (2020.02); *B60W 2552/50* (2020.02); *B60W 2554/404* (2020.02)

(58) Field of Classification Search
None
See application file for complete search history.

(56) References Cited

U.S. PATENT DOCUMENTS

| | | | |
|---|---|---|---|
| 9,495,874 B1 | 11/2016 | Zhu et al. | |
| 2006/0052933 A1* | 3/2006 | Ota | G08G 1/166 |
| | | | 701/532 |
| 2012/0330540 A1 | 12/2012 | Ozaki et al. | |
| 2013/0090806 A1* | 4/2013 | Hahne | G08G 1/162 |
| | | | 701/1 |
| 2018/0233047 A1* | 8/2018 | Mandeville-Clarke | |
| | | | B62D 15/0255 |
| 2019/0270447 A1* | 9/2019 | Tsuchiya | G08G 1/165 |
| 2019/0375410 A1* | 12/2019 | Zinner | B60W 30/16 |

FOREIGN PATENT DOCUMENTS

| | | | |
|---|---|---|---|
| JP | 2010-003157 A | 1/2010 | |
| JP | 2010-281746 A | 12/2010 | |
| JP | 2016-143137 A | 8/2016 | |
| WO | 2011/055823 A1 | 5/2011 | |
| WO | 2016/002276 A1 | 1/2016 | |

* cited by examiner

*Primary Examiner* — James J Lee
*Assistant Examiner* — David Hatch
(74) *Attorney, Agent, or Firm* — Young Basile Hanlon & MacFarlane, P.C.

(57) ABSTRACT

A vehicle-behavior prediction device includes: a priority determination section that determines the priority of a host vehicle and a vehicle concerned when the host vehicle and the vehicle concerned pass through a road section; and a vehicle control section that sets the time from when the vehicle concerned stops to when the host vehicle starts action to avoid the vehicle concerned to be shorter in a case where the priority of the host vehicle is low than in a case where the priority of the host vehicle is high.

6 Claims, 5 Drawing Sheets

| VEHICLE TYPE OF HOST VEHICLE AND VEHICLE CONCERNED | POINT TO BE ADDED |
|---|---|
| HEAVY VEHICLE | 3 |
| ORDINARY VEHICLE | 2 |
| LIGHT VEHICLE | 1 |

FIG. 5B

| ROAD STRUCTURE BEHIND HOST VEHICLE AND VEHICLE CONCERNED | POINT TO BE ADDED |
|---|---|
| GRADIENT ROAD | 1 |
| RAILROAD CROSSING | 3 |
| SCHOOL ZONE | 1 |
| NARROW ROAD WIDTH | 2 |

FIG. 5C

| SIGN POSTED ON VEHICLE CONCERNED | POINT TO BE ADDED |
|---|---|
| BEGINNER DRIVER SIGN | 1 |
| AGED DRIVER SIGN | 1 |

FIG. 6

VEHICLE-BEHAVIOR PREDICTION METHOD AND VEHICLE-BEHAVIOR PREDICTION DEVICE

TECHNICAL FIELD

The present invention relates to vehicle-behavior prediction methods and vehicle-behavior prediction devices.

BACKGROUND

Conventional techniques have been known for determining, depending on the traffic condition, the order of priorities of vehicles when they pass through a narrow road in which it is difficult for vehicles to pass by each other (Japanese Patent Application Publication No. 2016-143137). In the invention disclosed in Japanese Patent Application Publication No. 2016-143137, a host vehicle and a vehicle concerned exchange information on the time to be taken to get to a passing place and the number of following vehicles, and the order of priorities is determined based on the exchanged information.

SUMMARY

Unfortunately, the invention disclosed in Japanese Patent Application Publication No. 2016-143137 is based on the assumption that the host vehicle and the vehicle concerned have a function to exchange information. Hence, in the case where the host vehicle and the vehicle concerned cannot exchange information, it is difficult to determine the order of priorities, and thus those vehicles may not take avoidance action in a narrow road in a prompt manner.

The present invention has been made in light of the above problem, and an object thereof is to provide a vehicle-behavior prediction method and vehicle-behavior prediction device that allow a host vehicle and a vehicle concerned to take avoidance action in a prompt manner even if those vehicles cannot exchange information.

A vehicle-behavior prediction method according to an aspect of the present invention includes: determining the priority of a host vehicle and a vehicle concerned when the host vehicle and the vehicle concerned pass through a road section; and setting the time from when the vehicle concerned stops to when the host vehicle starts action to avoid the vehicle concerned to be shorter in a case where the priority of the host vehicle is low than in a case where the priority of the host vehicle is high.

The present invention makes it possible to take avoidance action in a prompt manner even if a host vehicle and a vehicle concerned cannot exchange information.

DETAILED DESCRIPTION

Hereinafter, an embodiment of the present invention will be described with reference to the drawings. In the illustration of the drawings, the same constituents are denoted by the same reference signs, and description thereof is omitted.

[Configuration of Vehicle-Behavior Prediction Device]

Figure 1:
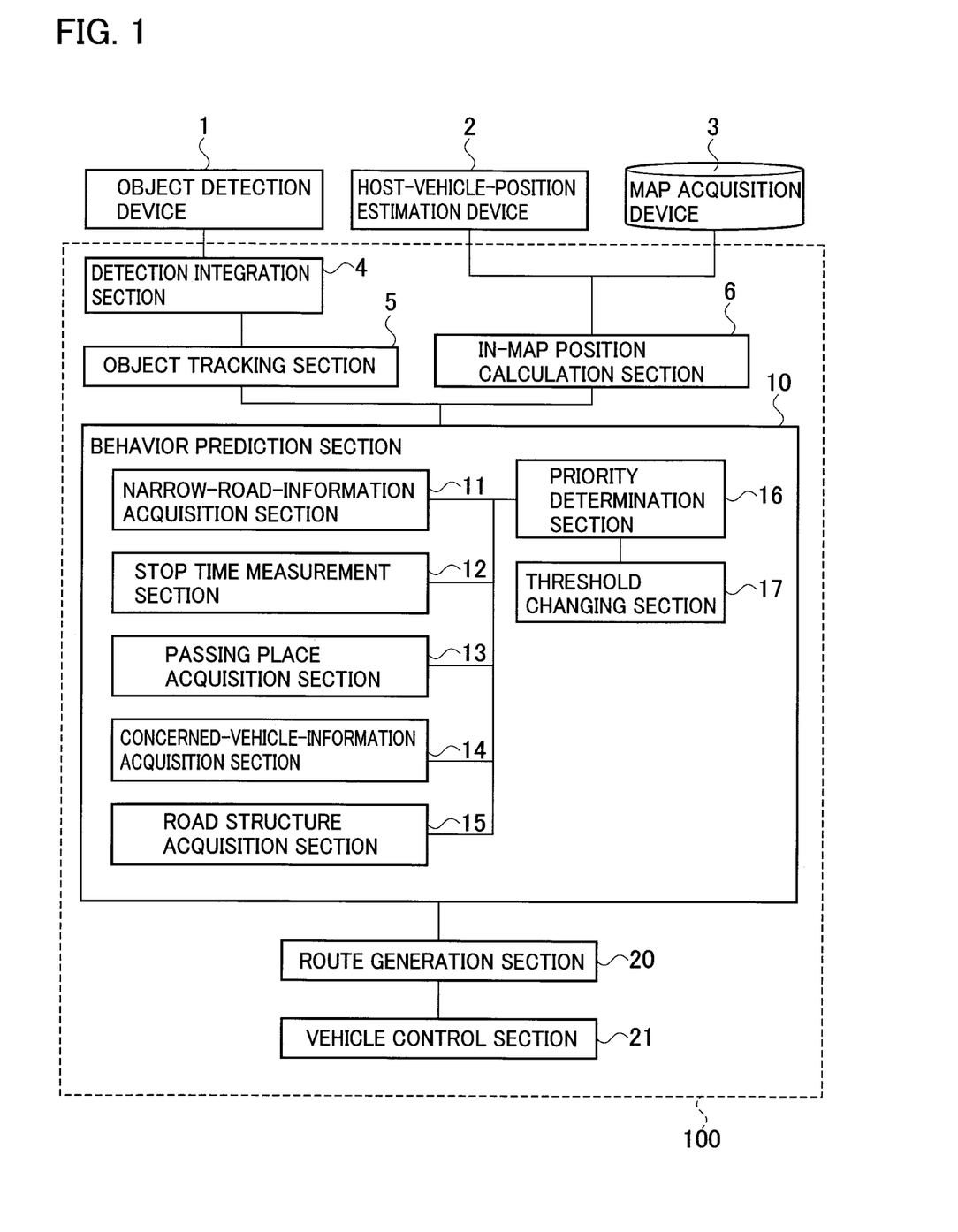
FIG. 1 is a schematic configuration diagram of a vehicle-behavior prediction device according to an embodiment of the present invention.

The configuration of a vehicle-behavior prediction device according to the present embodiment will be described with reference to FIG. 1. The vehicle-behavior prediction device includes an object detection device 1, a host-vehicle-position estimation device 2, a map acquisition device 3, and a controller 100. The vehicle-behavior prediction device is mainly used for an automated driving vehicle having an automated driving function, but the use of the vehicle-behavior prediction device is not limited to this kind of vehicle. The vehicle-behavior prediction device may be used for a vehicle without an automated driving function.

The object detection device 1 includes multiple object detection sensors of different kinds mounted on the host vehicle for detecting objects around the host vehicle, such as laser radars, millimeter wave radars, and cameras. The object detection device 1 detects objects around the host vehicle with the multiple object detection sensors. The object detection device 1 detects moving objects including other vehicles concerned, motorbikes, bicycles, and pedestrians and stationary objects including parked vehicles. The object detection device 1 detects, for example, the positions, orientations (yaw angles), sizes, speeds, accelerations, jerks, decelerations, and yaw rates of moving objects and stationary objects relative to the host vehicle.

The host-vehicle-position estimation device 2 includes a position detection sensor mounted on the host vehicle for measuring the absolute position of the host vehicle, such as a global positioning system (GPS) or an odometry. The host-vehicle-position estimation device 2 measures, using the position detection sensor, the absolute position of the host vehicle, specifically, the position, orientation, and speed of the host vehicle relative to a specified reference point.

The map acquisition device 3 acquires map information indicating structures of the road on which the host vehicle is traveling. The map information that the map acquisition device 3 acquires includes road structure information such as the absolute positions of traffic lanes and the lane connection relationship and relative position relationship between traffic lanes. The map acquisition device 3 may have a map database storing the map information or may acquire the map information from an external map data server by cloud computing. The map acquisition device 3 may use inter-vehicle communication or road-vehicle communication to acquire the map information.

The controller 100 controls the operation of the host vehicle based on the detection result by the object detection device 1 and the host-vehicle-position estimation device 2 and the information acquired by the map acquisition device 3. The controller 100 is a general-purpose microcomputer including a central processing unit (CPU), memory, and an input-output unit. The microcomputer has a computer program installed for making the microcomputer function as a surrounding-circumstance prediction device. The microcomputer, by executing the computer program, functions as multiple information processing circuits included in the vehicle-behavior prediction device. Note that although in the example shown here, the multiple information processing circuits included in the vehicle-behavior prediction device are implemented using software, the information processing circuits may be configured, as a matter of course, by using dedicated hardware for executing the information processes described below. The multiple information processing circuits may be configured using separate pieces of hardware.

The controller 100 includes a detection integration section 4, object tracking section 5, in-map position calculation section 6, behavior prediction section 10, route generation section 20, and vehicle control section 21, as the multiple information processing circuits. The behavior prediction section 10 includes a narrow-road-information acquisition section 11, stop-time measurement section 12, passing-place acquisition section 13, concerned-vehicle-information acquisition section 14, road-structure acquisition section 15, priority determination section 16, and threshold changing section 17.

The detection integration section 4 integrates multiple pieces of detection result acquired from the multiple object detection sensors included in the object detection device 1 to output one piece of detection result for each object. Specifically, the detection integration section 4 calculates the most reasonable behavior of each object having the smallest error, from the behavior of the object acquired from each of the object detection sensors, considering the error characteristics or the like of each object detection sensor. Specifically, using a known sensor fusion technique, the detection integration section 4 comprehensively evaluates detection result acquired by multiple kinds of sensors to obtain more accurate detection result.

The object tracking section 5 tracks objects detected by the detection integration section 4. Specifically, the object tracking section 5 verifies the behavior of an object outputted at different times to determine whether objects detected at the different times are the same (establishes associations) and tracks the object based on the association results. Note that the behavior of an object outputted at different times is stored in the memory inside the controller 100.

The in-map position calculation section 6 estimates, from the absolute position of the host vehicle obtained by the host-vehicle-position estimation device 2 and the map data acquired by the map acquisition device 3, the position and orientation of the host vehicle on the map.

The narrow-road-information acquisition section 11 acquires information on narrow roads from the map acquisition device 3. The narrow road refers to a road section in which it is difficult for a vehicle and an oncoming vehicle to pass by each other. Note that even a road section that allows a vehicle and an oncoming vehicle to pass by each other can be a narrow road depending on the condition. For example, assume that there is a road section in which a vehicle and an oncoming vehicle can pass by each other if both vehicles are light vehicles, the vehicle widths of which are small. In this road section, in the case where one of the vehicles traveling toward each other is a truck having a large vehicle width, even if the other is a light vehicle, the vehicle width of which is small, it can be difficult for these vehicles to pass by each other. Hence, such a road section can be a narrow road. Here, assume that there is a road section that allows a vehicle and an oncoming vehicle to pass by each other if both vehicles travel near the respective roadsides. In this road section, in the case where one or both of the drivers of vehicles traveling toward each other are beginners, it may be difficult for those vehicles to pass by each other because driving to travel near the roadside may be difficult. Hence, such a road section can be a narrow road.

The stop-time measurement section 12 measures the time since a vehicle concerned stopped based on information acquired from the object tracking section 5.

The passing-place acquisition section 13 acquires information on passing places from the map acquisition device 3. A passing place is a space provided for a narrow road, mainly for yielding the right of way when vehicles are traveling toward each other. The passing-place acquisition section 13 may acquire the amount of traffic at passing places. The passing-place acquisition section 13 may acquire the distance from the current position of the host vehicle or a vehicle concerned to a passing place.

The concerned-vehicle-information acquisition section 14 acquires information on (attributes of) a vehicle concerned from the object detection device 1. The attributes of a vehicle concerned mean, for example, the vehicle type of the vehicle concerned and a sign posted on the vehicle concerned.

The road-structure acquisition section 15 acquires road structures around the host vehicle and a vehicle concerned from the map acquisition device 3. Examples of road structures include gradient roads, railroad crossings, school zones, road widths, and crossroads.

The priority determination section 16 (priority determination circuit) determines the priority of a vehicle when the vehicle travels through a road section in which it is difficult for vehicles to pass by each other, based on information acquired from the narrow-road-information acquisition section 11, stop-time measurement section 12, passing-place acquisition section 13, concerned-vehicle-information acquisition section 14, and road-structure acquisition section 15. In the present embodiment, the priority is an objective indicator, and low priority does not necessarily mean that a vehicle takes avoidance action first because of its low priority. High priority does not necessarily mean that a vehicle does not avoidance action because its higher priority. A vehicle may take avoidance action first even if it has high priority. Note that avoidance action means a driving operation for yielding the right of way to the other vehicle, examples of which include, in a narrow road, moving backward or moving to the roadside. The priority is also an indicator used for changing a threshold described later.

The threshold changing section 17 changes a threshold based on the priority acquired from the priority determination section 16. The threshold in the present embodiment is an indicator used to start avoidance action, the details will be described later.

The route generation section 20 generates a route to take avoidance action. The vehicle control section 21 (vehicle control circuit) takes avoidance action by controlling various actuators (such as a steering actuator, an acceleration pedal actuator, and a brake actuator) of the host vehicle while using information from various sensors to proceed along the route generated by the route generation section 20. As described later, in the case where the priority of the host vehicle is low, the vehicle control section 21 sets the time from when the vehicle concerned stops to when the host vehicle starts action to avoid the vehicle concerned to be shorter than in the case where the priority of the host vehicle is high.

Next, an operation example of the vehicle-behavior prediction device will be described with reference to FIGS. 2 to 5.

Figure 2:
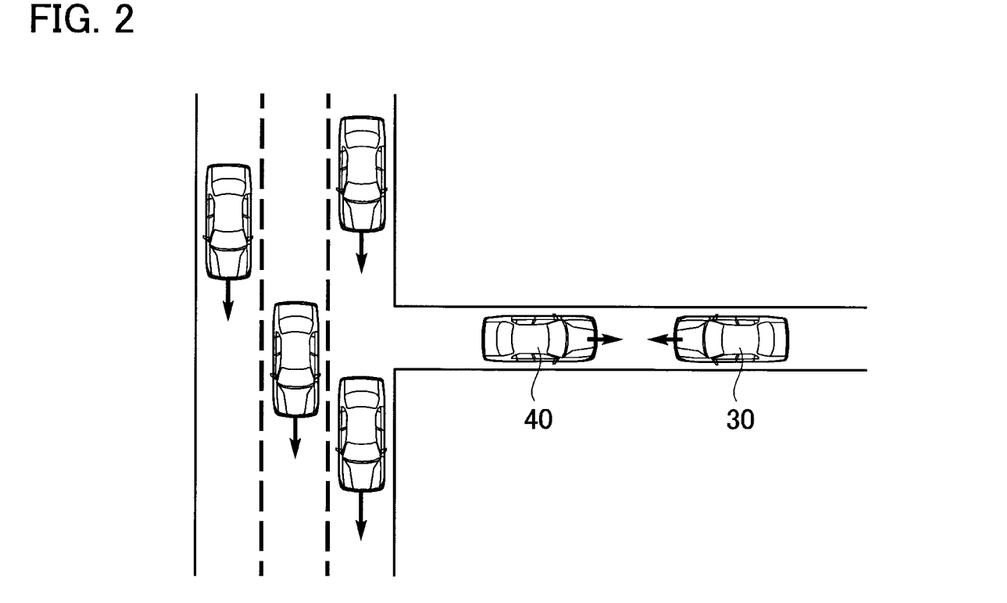
FIG. 2 is a diagram for explaining a host vehicle and a vehicle concerned traveling toward each other on a narrow road.
Figure 3:
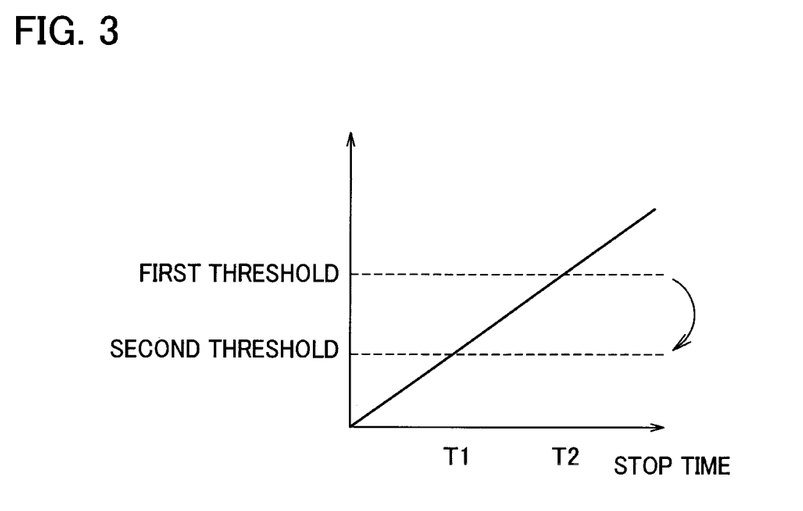
FIG. 3 is a graph illustrating the relationship between the stop time of a vehicle concerned and a threshold.

In the example illustrated in FIG. 2, a host vehicle 30 and a vehicle concerned 40 are traveling toward each other on a narrow road. In this case, one of the host vehicle 30 and the vehicle concerned 40 needs to yield the right of way to the other. Here, assume that the vehicle concerned 40 has stopped. In the case where the host vehicle 30 and the vehicle concerned 40 cannot exchange information with each other, it is difficult to determine whether the vehicle concerned 40's stopping indicates the intention of yielding the right of way or the intention of not yielding the right of way. In the case where the host vehicle 30 cannot determine the intention of the vehicle concerned 40 for a certain time after the vehicle concerned 40 stopped because the vehicle concerned 40 does not show any explicit action, the host vehicle 30 cannot proceed. Hence, the host vehicle 30 needs to take some action. As an example of an action that the host vehicle 30 can take, it is conceivable that the host vehicle 30 starts action to avoid the vehicle concerned 40 when the stop time, which is the time since the vehicle concerned 40 stopped, becomes or exceeds a specified time. Specifically, as illustrated in FIG. 3, it is conceivable that the host vehicle 30 takes avoidance action when the stop time of the vehicle concerned 40 has become or exceeded time T2. For example, if the host vehicle 30 takes action such as moving backward, and the host vehicle 30 and the vehicle concerned 40 can pass by each other, then the host vehicle 30 can proceed.

Note that the above specified time is determined according to a threshold set in advance, and time T2 is determined according to a first threshold as illustrated in FIG. 3. This threshold is an indicator for starting avoidance action and can be determined by experiment or simulations. Note that time T2 is not limited to a specific value. For example, it is 5 seconds.

Meanwhile, although it has been described that the host vehicle 30 takes avoidance action when the stop time of the vehicle concerned 40 becomes or exceeds time T2, if the host vehicle 30 can take avoidance action after a shorter stop time, the host vehicle 30 can take the avoidance action in a prompt manner. Specifically, if the host vehicle 30 can take avoidance action when the stop time of the vehicle concerned 40 becomes or exceeds, for example, time T1, which is illustrated in FIG. 3 and shorter than time T2, the host vehicle 30 can take the avoidance action in a prompt manner. In other words, for the vehicle-behavior prediction device according to the present embodiment, the time from when the vehicle concerned 40 stops to when the host vehicle 30 starts action to avoid the vehicle concerned 40 is short, so that the host vehicle 30 can take avoidance action in a prompt manner.

Hence, In the present embodiment, in the case where the priority of the host vehicle 30 is lower than the priority of the vehicle concerned 40, the threshold changing section 17 changes the threshold from the first threshold to a second threshold. Since the second threshold is smaller than the first threshold, the host vehicle 30 can take avoidance action after a shorter stop time.

Here, the priority will be described in detail. The priority determination section 16 determines priority based on information acquired from the concerned-vehicle-information acquisition section 14, the road-structure acquisition section 15, and the like. For example, the priority determination section 16 may determine the priority based on the vehicle type of the vehicle concerned 40 as an attribute of the vehicle concerned 40. For example, in the case where the vehicle concerned 40 is a heavy vehicle, a bus, a truck, or the like, the priority determination section 16 may determine that the priority of the vehicle concerned 40 is higher than the priority of the host vehicle 30. This is because the larger the vehicle concerned is relative to the road width, the more time it takes to take avoidance action, such as moving backward. In the case where the vehicle concerned 40 is an emergency vehicle, the priority determination section 16 may determine that the priority of the vehicle concerned 40 is higher than the priority of the host vehicle 30. The priority determination section 16 may determine the priority using the difference in vehicle width between the host vehicle 30 and the vehicle concerned 40 or the ratio of the vehicles. In the case where the host vehicle 30 is an ordinary passenger car, and where the vehicle concerned 40 is a heavy vehicle, a bus, a truck, or the like, the priority determination section 16 may determine that the priority of the vehicle concerned 40 is higher than the priority of the host vehicle 30.

The priority determination section 16 may determine the priority based on a sign posted on the vehicle concerned 40 as an attribute of the vehicle concerned 40. Examples of a sign posted on the vehicle include and a beginner driver sign and an aged driver sign. Note that signs posted on the vehicle may include a handicapped sign and a hearing impaired sign. In the case where the vehicle concerned 40 has a beginner driver sign or aged driver sign posted on it, the priority determination section 16 may determine that the priority of the vehicle concerned 40 is higher than the priority of the host vehicle 30. It is because that in the case where a sign such as a beginner driver sign or an aged driver sign is posted on a vehicle, the driver of this vehicle tends to take time to take avoidance action such as moving backward.

The priority determination section 16 may determine the priority based on information on the surroundings of the host vehicle 30 or the vehicle concerned 40. Examples of information on the surroundings of the host vehicle 30 and the vehicle concerned 40 include road structures around the host vehicle 30 or the vehicle concerned 40. For example, in the case where a road structure behind the vehicle concerned 40 is a gradient road as a road structure around the vehicle concerned 40, the priority determination section 16 may determine that the priority of the vehicle concerned 40 is higher than the priority of the host vehicle 30. It is because in the case where a road structure behind the vehicle concerned 40 is a gradient road, it is difficult for the vehicle concerned 40 to check areas behind it. In the case where both the host vehicle 30 and the vehicle concerned 40 are on a gradient road and where the host vehicle 30 is positioned on a downhill on the higher side of the gradient and the vehicle concerned 40 is positioned on an uphill on the lower side of the gradient, the priority determination section 16 may determine that the priority of the vehicle concerned 40 is higher than the priority of the host vehicle 30. It is because the vehicle concerned 40 needs to start on the uphill and it is harder to move forward.

In the case where a road structure behind the vehicle concerned 40 is a railroad crossing, the priority determination section 16 may determine that the priority of the vehicle concerned 40 is higher than the priority of the host vehicle 30. It is because in the case where a road structure behind is a railroad crossing, it is difficult for the vehicle concerned 40 to move backward. In the case where there is construction behind the vehicle concerned 40, the priority determination section 16 may determine that the priority of the vehicle concerned 40 is higher than the priority of the host vehicle 30. In the case where a road structure behind the vehicle concerned 40 is a school zone, the priority determination section 16 may determine that the priority of the vehicle concerned 40 is higher than the priority of the host vehicle 30. It is because in the case where a road structure behind is a school zone, it is difficult for the vehicle concerned 40 to move backward. School zones mean school-commuting road designated areas for kindergartens and elementary schools which vehicles are prohibited from entering during commuting hours. In the case where the road width behind the vehicle concerned 40 is smaller than the road width behind the host vehicle 30, the priority determination section 16 may determine that the priority of the vehicle concerned 40 is higher than the priority of the host vehicle 30. It is because in the case where the road width behind the vehicle concerned 40 is smaller than the road width behind the host vehicle 30, it is difficult for the vehicle concerned 40 to move backward.

Figure 4:
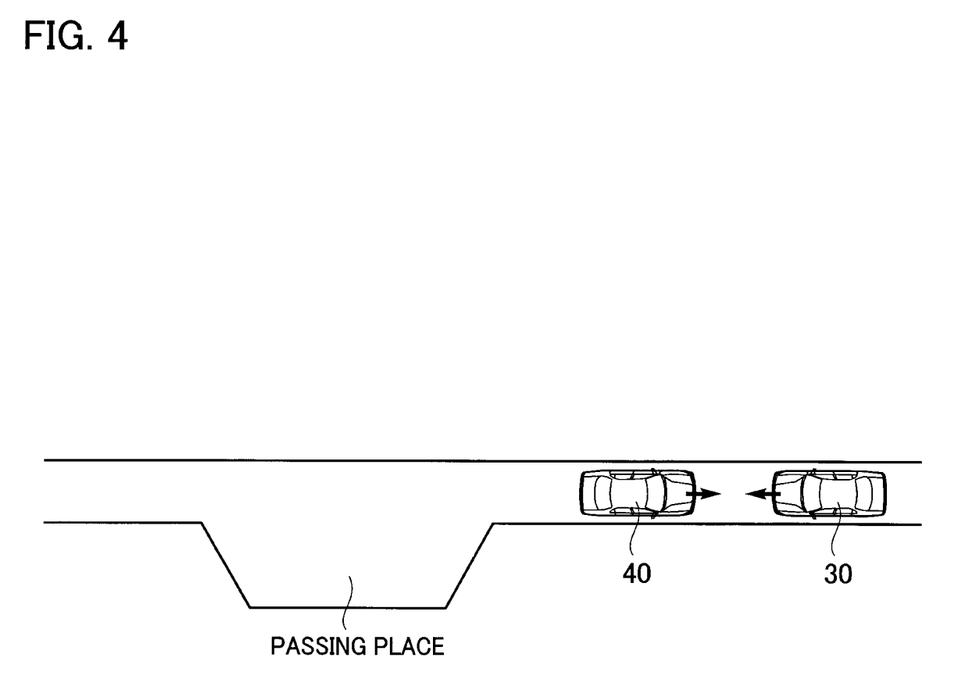
FIG. 4 is a diagram for explaining a host vehicle and a vehicle concerned traveling toward each other on a narrow road.

In the case where a road structure behind the vehicle concerned 40 is a passing place as illustrated in FIG. 4, the priority determination section 16 may determine the priority based on the amount of traffic at this passing place. For example, in the case where the amount of traffic at the passing place behind the vehicle concerned 40 is larger than a specified amount, the priority determination section 16 may determine that the priority of the vehicle concerned 40 is higher than the priority of the host vehicle 30. A road structure behind the host vehicle 30 is a passing place, the priority determination section 16 may determine the priority based on the amount of traffic at this passing place. For example, in the case where the amount of traffic at the passing place behind the host vehicle 30 is smaller than or equal to a specified amount, the priority determination section 16 may determine that the priority of the vehicle concerned 40 is higher than the priority of the host vehicle 30.

Figure 5A:
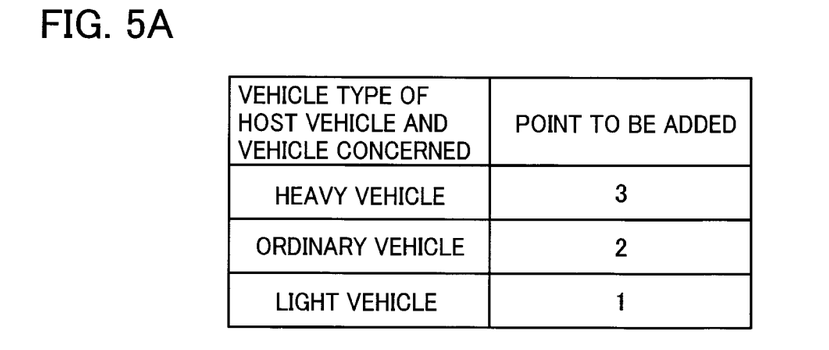
FIG. 5A is a table illustrating the relationship between the vehicle type and the point to be added.
Figure 5B:
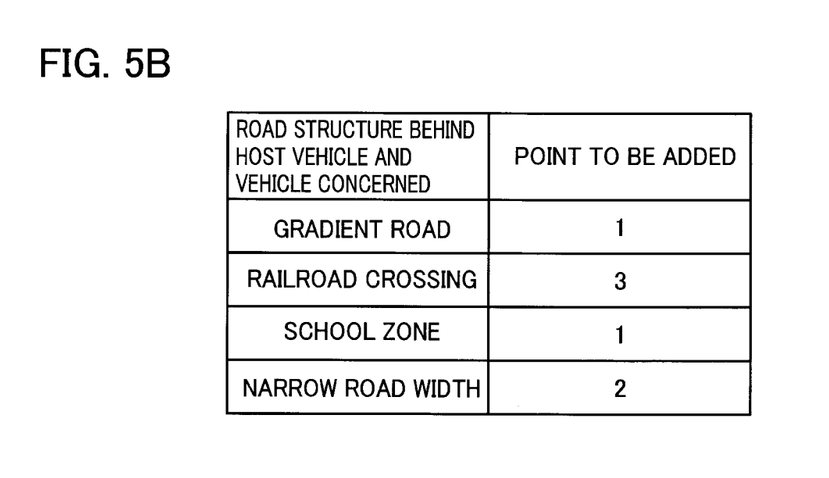
FIG. 5B is a table illustrating the relationship between the road structure and the point to be added.
Figure 5C:
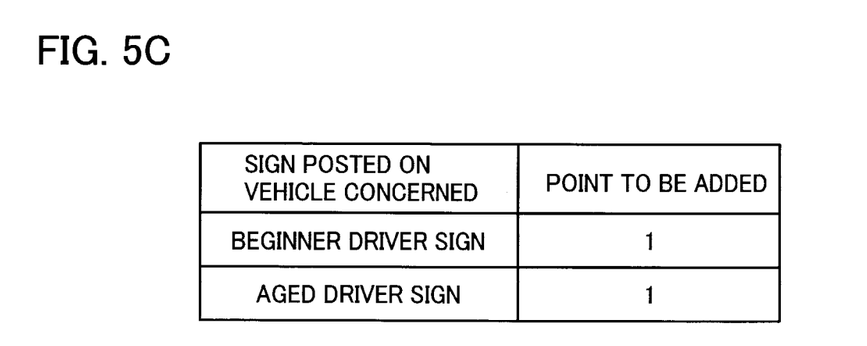
FIG. 5C is a table illustrating the relationship between the sign and the point to be added.

The priority determination section 16 may assign a point rating to information acquired from the concerned-vehicle-information acquisition section 14, the road-structure acquisition section 15, and the like and may determine that one having a higher rating has a higher priority. For example, in the case where the host vehicle 30 is an ordinary vehicle, and the vehicle concerned 40 is a heavy vehicle, 2 points are added to the host vehicle 30, and 3 points are added to the vehicle concerned 40, as illustrated in FIG. 5A. In the case where a road structure behind the host vehicle 30 is a gradient road, and a road structure behind the vehicle concerned 40 is a railroad crossing, 1 point is added to the host vehicle 30, and 3 points are added to the vehicle concerned 40, as illustrated in FIG. 5B. In the case where the vehicle concerned 40 has a beginner driver sign posted on it, 1 point is added to the vehicle concerned 40 as illustrated in FIG. 5C. The total number of points added to the host vehicle 30 is 3, and the total number of points added to the vehicle concerned 40 is 7. Thus, the priority determination section 16 determines that the priority of the vehicle concerned 40 is higher the priority of the host vehicle 30. As described above, the priority determination section 16 can determine the priority by weighing attributes of the vehicle concerned 40 and the host vehicle 30 and information on the surroundings of the vehicle concerned 40 and the host vehicle 30. The priority determination section 16 may determine the priority by weighing attributes of the vehicle concerned 40 and information on the surroundings of the vehicle concerned 40 or the host vehicle 30.

As has been described above, the priority determination section 16 can determine the priority by using a single piece of information acquired from the concerned-vehicle-information acquisition section 14, the road-structure acquisition section 15, or the like or by combining pieces of the information.

Based on the priority determined by the priority determination section 16, the threshold changing section 17 changes the threshold. In the case where the priority of the host vehicle 30 is lower than the priority of the vehicle concerned 40, the threshold changing section 17 changes the threshold from the first threshold illustrated in FIG. 3 to the second threshold. Note that the second threshold can be determined by, for example, weighing information acquired from the concerned-vehicle-information acquisition section 14, the road-structure acquisition section 15, or the like and adding each piece of the weighed information. The second threshold is expressed by equation 1.

[Math. 1]

$$\text{second threshold} = a1 \times b1 + a2 \times b2 + a3 \times b3 + a4 \times b4 + a5 \times b5 + a6 \times b6 + a7 \times b7 \quad (1)$$

Here, a1 to a7 are coefficients. The symbol b1 represents the amount of traffic behind the vehicle concerned 40. The symbol b2 represents the amount of traffic behind the host vehicle 30. The symbol b3 represents the road structure behind the vehicle concerned 40. The symbol b4 represents the road structure behind the host vehicle 30. The symbol b5 represents the vehicle type of the host vehicle 30. The symbol b6 represents the vehicle type of the vehicle concerned 40. The symbol b7 represents a sign posted on the vehicle concerned 40. The symbols b3 to b7 are determined based on FIGS. 5A to 5C.

[Operation Example of Vehicle-Behavior Prediction Device]

Figure 6:
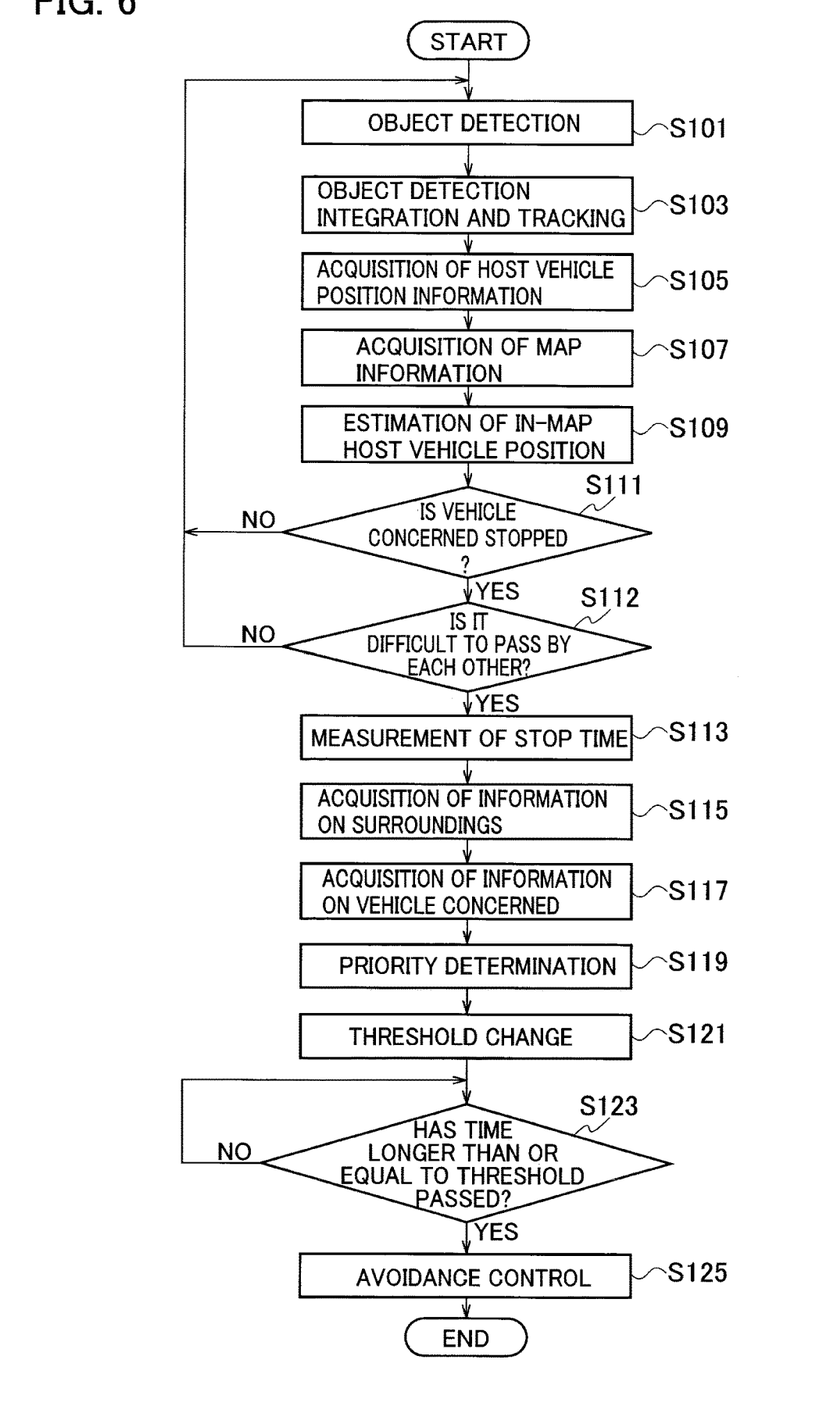
FIG. 6 is a flowchart for explaining an operation example of the vehicle-behavior prediction device according to the embodiment of the present invention.

Next, an operation example of the vehicle-behavior prediction device will be described with reference to a flowchart of FIG. 6. This flowchart starts, for example, when the ignition switch is turned on.

At step S101, the object detection device 1 detects objects (for example, other vehicles concerned) around the host vehicle with multiple object detection sensors. The process proceeds to step S103, at which the detection integration section 4 integrates multiple pieces of detection result obtained from multiple object detection sensors and outputs one piece of detection result for each vehicle concerned. Then, the object tracking section 5 tracks each vehicle concerned detected and integrated.

The process proceeds to step S105, at which the host-vehicle-position estimation device 2 measures the absolute position of the host vehicle with the position detection sensor. The process proceeds to step S107, at which the map acquisition device 3 acquires map information indicating structures of the road on which the host vehicle is traveling. The process proceeds to step S109, at which the in-map position calculation section 6 estimates the position and orientation of the host vehicle on the map from the absolute position of the host vehicle measured at step S105 and the map data acquired at step S107.

The process proceeds to step S111, at which if the vehicle concerned is stopped (Yes at step S111), the process proceeds to step S112. On the other hand, if the vehicle concerned is not stopped (No at step S111), the process returns to step S101.

At step S112, the controller 100 determines whether the road on which the host vehicle is traveling is a narrow road in which it is difficult for the host vehicle and the vehicle concerned to pass by each other. If the road on which the host vehicle 30 is traveling is a narrow road in which it is difficult for the host vehicle 30 and the stopped vehicle concerned 40 to pass by each other as illustrated in FIG. 2 (Yes at step S112), the process proceeds to step S113. On the other hand, if the road on which the host vehicle 30 is traveling is not a narrow road in which it is difficult for the host vehicle 30 and the stopped vehicle concerned 40 to pass by each other (No at step S112), the process returns to step S101.

At step S113, the stop-time measurement section 12 measures the time for which the vehicle concerned 40 has stopped. The process proceeds to step S115, at which the road-structure acquisition section 15 acquires road structures around the host vehicle 30 and the vehicle concerned 40. The process proceeds to step S117, at which the concerned-vehicle-information acquisition section 14 acquires information on the vehicle concerned 40. The process proceeds to step S119, at which the priority determination section 16 determines the priority based on information acquired from the concerned-vehicle-information acquisition section 14, the road-structure acquisition section 15, or the like.

The process proceeds to step S121, at which if the priority of the host vehicle 30 is lower than the priority of the vehicle concerned 40, the threshold changing section 17 changes the threshold from the first threshold to the second threshold as illustrated in FIG. 3. The process proceeds to step S123, at which if the stop time of the vehicle concerned 40 is shorter than the first threshold (No at step S123), the process waits. On the other hand, if the stop time of the vehicle concerned 40 becomes or exceeds the first threshold (Yes at step S123), the process proceeds to step S125, and the vehicle control section 21 takes avoidance action.

[Operational Advantage]

As has been described above, the vehicle-behavior prediction device according to the present embodiment provides the following operational advantages.

In the case where the priority of the host vehicle 30 is lower than the priority of the vehicle concerned 40, the vehicle-behavior prediction device changes the threshold from the first threshold to the second threshold (see FIG. 3). Specifically, in the case where the priority of the host vehicle 30 is low, the vehicle-behavior prediction device sets the time from when the vehicle concerned 40 stops to when the host vehicle 30 starts action to avoid the vehicle concerned 40 to be shorter than in the case where the priority of the host vehicle 30 is high. In a road section in which it is difficult for vehicles to pass by each other, in the case where the host vehicle 30 and the vehicle concerned 40 cannot exchange information, it is difficult to know the intention of the vehicle concerned 40 based on the fact that the vehicle concerned 40 has stopped. Hence, in the case where the priority of the host vehicle 30 is low, the vehicle-behavior prediction device sets the time from when the vehicle concerned 40 stops to when the host vehicle 30 starts action to avoid the vehicle concerned 40 to be shorter than in the case where the priority of the host vehicle 30 is high. This allows the vehicle-behavior prediction device to take avoidance action in a prompt manner.

The vehicle-behavior prediction device may determine the priority based on attributes of the vehicle concerned 40. Depending on the attributes of the vehicle concerned 40, it may be difficult for the vehicle concerned 40 to take avoidance action. The vehicle-behavior prediction device determines the priority based on attributes of the vehicle concerned 40, so that it can take avoidance action in a prompt manner.

The vehicle-behavior prediction device may determine the priority based on information on the surroundings of the vehicle concerned 40 or the host vehicle 30. Depending on information on the surroundings of the vehicle concerned 40 or the host vehicle 30, it may be difficult for the vehicle concerned 40 to take avoidance action. The vehicle-behavior prediction device determines the priority based on information on the surroundings of the vehicle concerned 40 or the host vehicle 30, so that it can take avoidance action in a prompt manner.

The vehicle-behavior prediction device may determine the priority by weighing attributes of the vehicle concerned 40 and information on the surroundings of the vehicle concerned 40 or the host vehicle 30. By weighing each piece of information as illustrated in FIGS. 5A to 5C, the vehicle-behavior prediction device can determine the priority with various situations taken into account. Note that the vehicle-behavior prediction device may determine the priority by weighing attributes of the vehicle concerned 40 and the host vehicle 30 and information on the surroundings of the vehicle concerned 40 and the host vehicle 30.

The vehicle-behavior prediction device may determine the priority based on road structures around the vehicle concerned 40. Depending on the road structure around the vehicle concerned 40, it may be difficult for the vehicle concerned 40 to take avoidance action. Hence, the vehicle-behavior prediction device determines the priority based on road structures around the vehicle concerned 40. In the case where the priority of the host vehicle 30 is low, the vehicle-behavior prediction device sets the time from when the vehicle concerned 40 stops to when the host vehicle 30 starts action to avoid the vehicle concerned 40 to be shorter than in the case where the priority of the host vehicle 30 is high. This allows the vehicle-behavior prediction device to take avoidance action in a prompt manner.

In the case where there is a gradient road behind the vehicle concerned 40, the vehicle-behavior prediction device may determine that the priority of the vehicle concerned 40 is higher than the priority of the host vehicle 30. In the case where there is a gradient road behind the vehicle concerned 40, it may be difficult for the vehicle concerned 40 to take avoidance action because it is difficult for the vehicle concerned 40 to check areas behind it. In the case where there is a gradient road behind the vehicle concerned 40, the vehicle-behavior prediction device determines that the priority of the vehicle concerned 40 is high, so that it can take avoidance action in a prompt manner.

In the case where there is a railroad crossing behind the vehicle concerned 40, the vehicle-behavior prediction device may determine that the priority of the vehicle concerned 40 is higher than the priority of the host vehicle 30. In the case where there is a railroad crossing behind the vehicle concerned 40, it may be difficult for the vehicle concerned 40 to take avoidance action. In the case where there is a railroad crossing behind the vehicle concerned 40, the vehicle-behavior prediction device determines that the priority of the vehicle concerned 40 is high, so that it can take avoidance action in a prompt manner.

In the case where there is a school zone behind the vehicle concerned 40, the vehicle-behavior prediction device may determine that the priority of the vehicle concerned 40 is higher than the priority of the host vehicle 30. In the case where there is a school zone behind the vehicle concerned 40, it may be difficult for the vehicle concerned 40 to take avoidance action. In the case where there is a school zone behind the vehicle concerned 40, the vehicle-behavior prediction device determines that the priority of the vehicle concerned 40 is high, so that it can take avoidance action in a prompt manner.

In the case where the road width at the point where the vehicle concerned 40 is positioned is smaller than the road width at the point where the host vehicle 30 is positioned, the vehicle-behavior prediction device may determine that the priority of the vehicle concerned 40 is higher than the priority of the host vehicle 30. In the case where the road width at the point where the vehicle concerned 40 is positioned is smaller than the road width at the point where the host vehicle 30 is positioned, it may be difficult for the vehicle concerned 40 to take avoidance action. In the case where the road width at the point where the vehicle concerned 40 is positioned is smaller than the road width at the point where the host vehicle 30 is positioned, the vehicle-behavior prediction device determines that the priority of the vehicle concerned 40 is high, so that it can take avoidance action in a prompt manner.

In the case where the amount of traffic at the passing place around the vehicle concerned 40 is larger than or equal to a specified amount, the vehicle-behavior prediction device may determine that the priority of the vehicle concerned 40 is higher than the priority of the host vehicle 30. This allows the vehicle-behavior prediction device to take avoidance action in a prompt manner. In the case where the amount of traffic at the passing place around the host vehicle 30 is smaller than or equal to a specified amount, the vehicle-behavior prediction device may determine that the priority of the vehicle concerned 40 is higher than the priority of the host vehicle 30. This allows the vehicle-behavior prediction device to take avoidance action in a prompt manner.

The vehicle-behavior prediction device may determine the priority based on the vehicle type of the vehicle concerned 40. Depending on the vehicle type of the vehicle concerned 40, it may be difficult for the vehicle concerned 40 to take avoidance action. Hence, the vehicle-behavior prediction device determines the priority based on the vehicle type of the vehicle concerned 40. Then, in the case where the priority of the host vehicle 30 is low, the vehicle-behavior prediction device sets the time from when the vehicle concerned 40 stops to when the host vehicle 30 starts action to avoid the vehicle concerned 40 to be shorter than in the case where the priority of the host vehicle 30 is high. This allows the vehicle-behavior prediction device to take avoidance action in a prompt manner.

The vehicle-behavior prediction device may determine the priority based on a sign posted on the vehicle concerned 40. Depending on the sign posted on the vehicle concerned 40, it may be difficult for the vehicle concerned 40 to take avoidance action. Hence, the vehicle-behavior prediction device determines the priority based on a sign posted on the vehicle concerned 40. Then, in the case where the priority of the host vehicle 30 is low, the vehicle-behavior prediction device sets the time from when the vehicle concerned 40 stops to when the host vehicle 30 starts action to avoid the vehicle concerned 40 to be shorter than in the case where the priority of the host vehicle 30 is high. This allows the vehicle-behavior prediction device to take avoidance action in a prompt manner.

Each function described in the embodiment above can be implemented using one or more processing circuits. Examples of processing circuits include a programmed processing device such as a processing device including an electrical circuit. Examples of processing circuits include an application specific integrated circuit (ASIC) and a device such as a circuit part that are arranged to execute described functions. The vehicle-behavior prediction device can improve functions of a computer.

Although an embodiment of the present invention has been described above, it should not be understood that the descriptions and drawings consisting part of this disclosure limit this invention. From this disclosure, various alternative embodiments, examples, and operational techniques will be apparent to those skilled in the art.

For example, the vehicle-behavior prediction device may determine the priority based on the stop position of the vehicle concerned 40. It can be estimated that the vehicle concerned 40 does not have the intention of yielding the right of way in the case where the vehicle concerned 40 has stopped in the center of the road width. On the other hand, it can be estimated that the vehicle concerned 40 has the intention of yielding the right of way in the case where the vehicle concerned 40 has stopped at an edge of road width. Hence, the vehicle-behavior prediction device acquires the distance from the center position of the road width to the center position of the vehicle concerned 40 in the vehicle width direction. Then, in the case where this distance is smaller than or equal to a specified value, the vehicle-behavior prediction device may determine that the priority of the vehicle concerned 40 is higher than the priority of the host vehicle 30.

In the state where the vehicle concerned 40 is stopped, the vehicle-behavior prediction device may move forward and determine the priority based on the response of the vehicle concerned 40 to this forward movement. In the case where the vehicle concerned 40 continues to be stopped after the host vehicle 30 moves forward, the vehicle-behavior prediction device may determine that the priority of the vehicle concerned 40 is higher than the priority of the host vehicle 30.

Note that although in FIG. 3, the relationship between the stop time of the vehicle concerned 40 and the threshold was described assuming that the relationship is linear (straight line), the relationship is not limited to linear ones. The relationship between the stop time of the vehicle concerned 40 and the threshold may be nonlinear.

The vehicle-behavior prediction device may predict the route that the stopped vehicle concerned 40 will take, and the host vehicle 30 may take action to avoid the predicted route.

In the case where the vehicle concerned 40 has entered a narrow road earlier than the host vehicle 30, the vehicle-behavior prediction device may determine that the priority of the vehicle concerned 40 is higher than the priority of the host vehicle 30. In the case where the vehicle concerned 40 has entered a narrow road earlier than the host vehicle 30, the distance that the vehicle concerned 40 has traveled may be larger than the distance that the host vehicle 30 has traveled on the narrow road. In this case, avoidance action taken by the host vehicle 30 at an early timing can minimize the effects imposed on the flow of traffic.

In the case where there is a crossroad behind the host vehicle 30, and where the vehicle concerned 40 has tuned on a turn signal, the vehicle-behavior prediction device may determine that the priority of the vehicle concerned 40 is higher than the priority of the host vehicle 30. Avoidance action taken by the host vehicle 30 at an earlier timing will allow the vehicle concerned 40 to turn promptly, which in turn allows the host vehicle 30 to move forward smoothly.

REFERENCE SIGNS LIST 1 object detection device
2 host-vehicle-position estimation device
3 map acquisition device
4 detection integration section
5 object tracking section
6 in-map position calculation section 10 behavior prediction section
11 narrow-road-information acquisition section
12 stop-time measurement section
13 passing-place acquisition section
14 concerned-vehicle-information acquisition section
15 road-structure acquisition section
16 priority determination section
17 threshold changing section
20 route generation section
21 vehicle control section
100 controller

The invention claimed is:

1. A vehicle-behavior prediction method for a controller of a host vehicle comprising:
    determining whether a road section in which the host vehicle and a concerned vehicle are travelling is too narrow for the host vehicle and the concerned vehicle to pass by each other;
    determining a priority of the host vehicle and a priority of the concerned vehicle based on a distance from a center position of a road width to a center position of the concerned vehicle in a vehicle width direction;
    setting a time from when the concerned vehicle stops to when the host vehicle starts action to avoid the concerned vehicle to be shorter in a first case than in a second case, wherein the priority of the host vehicle is lower than the priority of the concerned vehicle in the first case, and the priority of the host vehicle is higher than the priority of the concerned vehicle in the second case; and
    controlling the host vehicle to start action to avoid the concerned vehicle.

2. A vehicle-behavior prediction method for a controller of a host vehicle comprising:
    determining whether a road section in which the host vehicle and a concerned vehicle are travelling is too narrow for the host vehicle and the concerned vehicle to pass by each other;
    determining a priority of the host vehicle and a priority of the concerned vehicle;
    setting a time from when the concerned vehicle stops to when the host vehicle starts action to avoid the concerned vehicle to be shorter in a first case than in a second case, wherein the priority of the host vehicle is lower than the priority of the concerned vehicle in the first case, and the priority of the host vehicle is higher than the priority of the concerned vehicle in the second case; and
    controlling the host vehicle to start action to avoid the concerned vehicle,
    wherein the priority of at least one of the host vehicle or the concerned vehicle is determined based on information on surroundings of at least one of the host vehicle or the concerned vehicle,
    the information on the surroundings of the concerned vehicle is a road structure around the concerned vehicle, and
    in a case where a road structure behind the concerned vehicle is a railroad crossing, it is determined that the priority of the concerned vehicle is higher than the priority of the host vehicle.

3. A vehicle-behavior prediction method for a controller of a host vehicle comprising:
    determining whether a road section in which the host vehicle and a concerned vehicle are travelling is too narrow for the host vehicle and the concerned vehicle to pass by each other;
    determining a priority of the host vehicle and a priority of the concerned vehicle;
    setting a time from when the concerned vehicle stops to when the host vehicle starts action to avoid the concerned vehicle to be shorter in a first case than in a second case, wherein the priority of the host vehicle is lower than the priority of the concerned vehicle in the first case, and the priority of the host vehicle is higher than the priority of the concerned vehicle in the second case; and
    controlling the host vehicle to start action to avoid the concerned vehicle,
    wherein the priority of at least one of the host vehicle or the concerned vehicle is determined based on information on surroundings of at least one of the host vehicle or the concerned vehicle,
    the information on the surroundings of the concerned vehicle is a road structure around the concerned vehicle, and
    in a case where a road structure behind the concerned vehicle is a school zone, it is determined that the priority of the concerned vehicle is higher than the priority of the host vehicle.

4. A vehicle-behavior prediction method for a controller of a host vehicle comprising:
    determining whether a road section in which the host vehicle and a concerned vehicle are travelling is too narrow for the host vehicle and the concerned vehicle to pass by each other;
    determining a priority of the host vehicle and a priority of the concerned vehicle;
    setting a time from when the concerned vehicle stops to when the host vehicle starts action to avoid the concerned vehicle to be shorter in a first case than in a second case, wherein the priority of the host vehicle is lower than the priority of the concerned vehicle in the first case, and the priority of the host vehicle is higher than the priority of the concerned vehicle in the second case; and
    controlling the host vehicle to start action to avoid the concerned vehicle,
    wherein the priority of at least one of the host vehicle or the concerned vehicle is determined based on information on surroundings of at least one of the host vehicle or the concerned vehicle,
    the information on the surroundings of the concerned vehicle is a road structure around the concerned vehicle, and
    in a case where the road structure is a passing place and where an amount of traffic at a passing place around the concerned vehicle is larger than or equal to a specified amount, or the amount of traffic at a passing place around the host vehicle is smaller than or equal to the specified amount, it is determined that the priority of the concerned vehicle is higher than the priority of the host vehicle.

5. A vehicle-behavior prediction method for a controller of a host vehicle comprising:
    determining whether a road section in which the host vehicle and a concerned vehicle are travelling is too narrow for the host vehicle and the concerned vehicle to pass by each other;
    determining a priority of the host vehicle and a priority of the concerned vehicle;
    setting a time from when the concerned vehicle stops to when the host vehicle starts action to avoid the concerned vehicle to be shorter in a first case than in a second case, wherein the priority of the host vehicle is lower than the priority of the concerned vehicle in the first case, and the priority of the host vehicle is higher than the priority of the concerned vehicle in the second case; and controlling the host vehicle to start action to avoid the concerned vehicle, wherein the priority of at least one of the host vehicle or the concerned vehicle is determined based on information on surroundings of at least one of the host vehicle or the concerned vehicle, and in a case where there is a crossroad behind the host vehicle and where the concerned vehicle has turned on a turn signal, it is determined that the priority of the concerned vehicle is higher than the priority of the host vehicle.

6. A vehicle-behavior prediction device comprising:

a priority determination circuit that determines, based on map information, whether a road section in which a host vehicle and a concerned vehicle are travelling is too narrow for the host vehicle and the concerned vehicle to pass by each other, and determines a priority of the host vehicle and a priority of the concerned vehicle based on a distance from a center position of a road width to a center position of the concerned vehicle in a vehicle width direction; and a vehicle control circuit that sets a time from when the concerned vehicle stops to when the host vehicle starts action to avoid the concerned vehicle to be shorter in a first case than in a second case, and controls the host vehicle to start action to avoid the concerned vehicle, wherein the priority of the host vehicle is lower than the concerned vehicle in the first case, and the priority of the host vehicle is higher than the priority of the concerned vehicle in the second case.

* * * * *